(12) United States Patent
Elze et al.

(10) Patent No.: US 6,386,247 B1
(45) Date of Patent: May 14, 2002

(54) VALVE FOR A DUNNAGE BAG

(76) Inventors: Helmut Richard Elze, 827 Grosvenor Pl., Oakland, CA (US) 94610; Olaf Dietrich Elze, 284 La Quinta Ct., Walnut Creek, CA (US) 94598; Mark J Caires, 2560 Downing Ave., San Jose, CA (US) 95128

( * ) Notice: Subject to any disclaimer, the term of this patent is extended or adjusted under 35 U.S.C. 154(b) by 0 days.

(21) Appl. No.: 09/789,909

(22) Filed: Feb. 20, 2001

(51) Int. Cl.[7] .................................................. B65B 3/16
(52) U.S. Cl. ........................ 141/114; 141/68; 141/349; 137/223; 137/859
(58) Field of Search ............................. 141/67, 68, 114, 141/285, 286, 301, 313–317, 324, 348, 349, 350, 367, 382, 387, 389, 392; 137/223, 859; 206/522

(56) References Cited

U.S. PATENT DOCUMENTS 4,262,801 A * 4/1981 Avery .......................... 206/522
5,121,840 A * 6/1992 Schram ....................... 206/522

* cited by examiner

*Primary Examiner*—Timothy L. Maust
(74) *Attorney, Agent, or Firm*—Robert Samuel Smith

(57) ABSTRACT

A valve for a dunnage bag including an inner part having a flange that is laminated to the inside surface of the bag and an outer part having a flange that is laminated to the outside surface of the bag providing that the bag can be inflated/deflated by air passing through both parts and a hole in the bag. The outerpart is a bowl which is stretched away from the bag when the bag is being inflated and which collapses against opening in the inner part to seal the bag and prevent air loss.

10 Claims, 1 Drawing Sheet

VALVE FOR A DUNNAGE BAG

FIELD OF THE INVENTION

This invention relates to closures for dunnage bags such as are used between pallets to cushion cargo in transit and particularly to a valve that features secure a flexible cap that readily deforms to permit sealing the bag.

BACKGROUND AND INFORMATION DISCLOSURE

Common practice to protect cargo stacked on pallets during transit is to position bags filled with moderately compressed air between the rows of pallets. The bags are typically vinyl or reinforced paper.

Because of the large number of bags in use there has been much interest in reducing the cost of the bags and associated equipment and reducing the time and inconvenience required to place and inflate the bags and then deflate and remove of the bag after transit is complete. A number of disclosures have appeared to reduce these costs and inconveniences.

For example, U.S. Pat. No. 4,073,389 to Angarola et al discloses a housing engaging a spring loaded plug that permits one way entry of air into the bag. The valve tends to disfunction with aging of the spring.

U.S. Pat. No. 4,102,364 to Leslie et al discloses a system for rapid pressurizing the air inside the bag from a source of high pressure air.

U.S. Pat. Nos. 4,146,069 and 4,146,070 to Angarola et al discloses another system for rapid filling using a stream of pressurized air to aspirate ambient air into the bag.

The foregoing systems require a source of high compressed air which are not always available.

U.S. Pat. No. 5,111,838 to Langston discloses a spring loaded valve member movable to open a passage and threaded opening to engage an air hose.

U.S Pat. No. 5,806,572 discloses an apparatus for inflating a bag to a desired limit.

U.S. Pat. No. 6,053,222 discloses a gun that both inflates the bag when required and accelerates deflation of the bag when required.

SUMMARY OF THE INVENTION

It is an object of this invention to provide a valve for a container such as a dunnage bag which has several advantages over the valves of the prior art.

One advantage is that the outmost surface of the valve is substantially coincident with the surface of the bag. This is an important feature for preventing damage to the bag or release of air due to inadvertent contact of the valve with neighboring objects such as another pallet.

Another advantage is avoidance of leakage of air from the bag such as often occurs with threaded valves of the prior art that are not completely tightened.

Another advantage of the device is that it can be injected molded as two integrally formed parts thereby substantially minimizing the cost to produce the valve.

Another advantage is that the valve of this invention does not rely on spring biasing that is prone to degrade with time.

This invention is directed toward an inner bowl having a flange that is laminated to the inside surface around a hole of the bag and a flexible outer bowl having a flange that is laminated to the outside surface around an opening in the bag. When inflating the bag, air enters through a tube in the outer bowl and passes through apertures in the inner bowl and into the bag. After the bag is fully inflated, the outer bowl is pressed against the inner bowl so as to close off the apertures to prevent the gas from escaping. The gas is further sealed by a cap that engages the entry end of the outside bowl.

DESCRIPTION OF PREFERRED EMBODIMENTS

Figure 1:
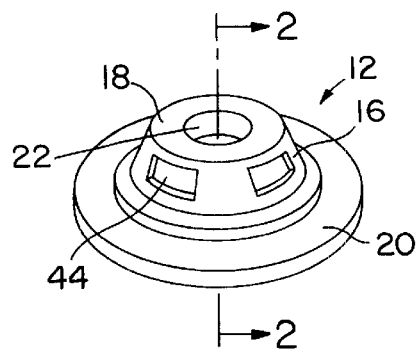
FIG. 1 is a perspective view of the inner bowl of the valve.
Figure 2:
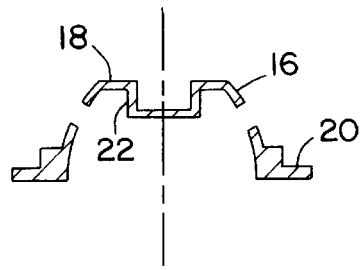
FIG. 2 is a sectional view of FIG. 1.
Figure 3:
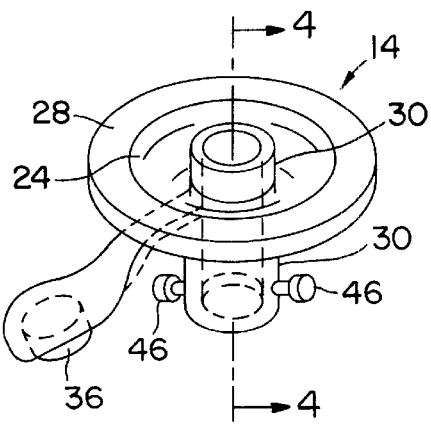
FIG. 3 is a perspective view of the outer bowl of the valve.

Turning now to a discussion of the drawings, FIG. 1 is a perspective view of an inner part 12 of the invention. FIG. 2 is a sectional view of FIG. 1. FIG. 3 is a perspective view of an outer part 14 that cooperates with the inner part to form the complete valve FIG. 4 is a sectional view of FIG. 3.

As shown in FIGS. 1 and 2, the inner part 12 comprises an inner bowl 16 having a floor 18. A flange 20 is joined to the rim of bowl 16. A cylindrical stub 22 is formed on the floor 18 of the bowl 16 concentrically aligned with the bowl 16. A plurality of openings 44 in the inner bag are shown.

Figure 4:
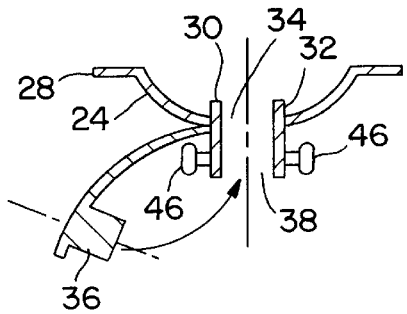
FIG. 4 is a sectional view of FIG. 3.

As shown in FIGS. 3 and 4, the outer part 14 comprises an outer bowl 24 with a flange 28 around the rim of the outer bowl 24. A tube 30 has one end 32 integrally joined to of the outer bowl around a hole 34 in the outer bowl. A cap 36 for the extended open end 38 of the tube 32 is tethered to the outer bowl 24.

The inner part 12 and outer part 14 are each integrally formed of flexible vinyl. The bowls 12, 14 are about 1/16 inches thick.

Figure 5:
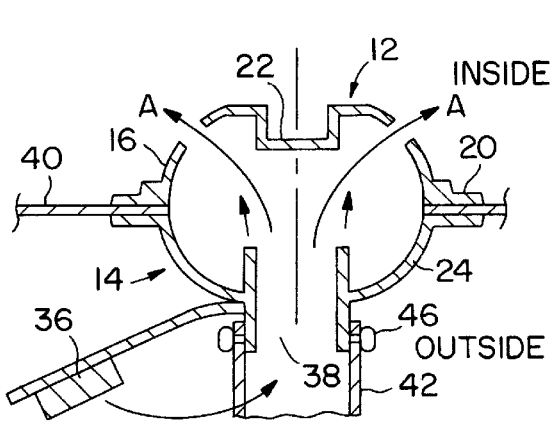
FIG. 5 shows the inner and outer bowls laminated to the bag around an opening in the bag in preparation to inflating the bag.

FIG. 5 is a sectional view of the bag showing the bag 40 (cutaway) sandwiched between the flanges 20 and 28 of the inner part and the outer part 14. The flanges 20, 28 are sealed to the bag.

FIG. 5 shows the lid positioned such that an air gun 42 (cutaway) is attached by catches 46 to the extended open entry end 38 of the tube 30 providing that the bag can be inflated as indicated by arrows A. Air from gun 42 passes through the entry end 38 of tube 32 then through openings 44 in inner bowl 16 and into the bag.

Figure 6:
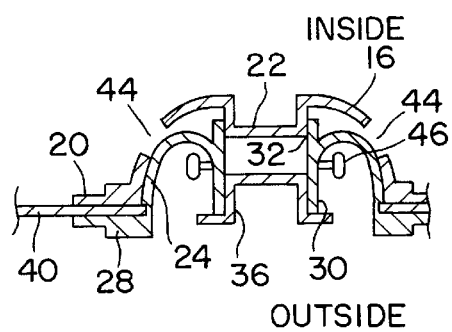
FIG. 6 shows, that after inflation, the outer bowl is deformed against the inner bowl thereby sealing off holes in the inner bowl to prevent escape of air.

FIG. 6 shows the valve-bag assembly after the bag 40 (cutaway) has been inflated and the outer bowl 24 (now turned inside out) is pressed against the surface of the inner bowl 16. The pressing against the inner bowl 16 closes off the openings 44 in the inner bowl 16 thereby preventing the pressurized air inside the bag from escaping. The stud 22 is plugged into the end 32 of tube 30. The tethered cap 36 is plugged into the open end of tube 30 opposite stud 22.

The invention has several advantages compared to the prior art. The invention operates on a principle of a flexible part folding against and sealing air passages when required according to a construction that is not disclosed in the prior art. Absence of threaded unions and springs protects against threaded joints and springs that loosen with time. The low profile helps to avoid damage to the valve. The molded construction is amenable to low cost.

Modifications and variations may be contemplated after reading the specification and studying the drawings that are within the scope of the invention. It is therefore desired to define the scope of the invention by the appended claims.

What is claimed is:

1. A valve for admitting, retaining then releasing pressurized gas in a container which comprises:

an inner bowl with a flange around a rim of said inner bowl, a plug in a floor of said bowl and a plurality of apertures through said bowl between said flange and said plug;

an outer bowl with a flange around a rim of said outer bowl and a tube extending through a center hole of said outer bowl;

an edge of said hole integrally sealed to said tube between ends of said tube;

said outer bowl comprising a flexible sheet;

said plug, tube and flanges of said inner and outer bowls operably arranged to permit laminating said flange of said inner bowl to one surface of said container and laminating said flange of said outer bowl to an opposite side of said container with said flanges surrounding an opening in said container and with said inner bowl and outer bowl extending away from said opening to permit admission of pressurized gas from outside said container, through an entry end of said tube, out of an exit end of said tube, then through said plurality of apertures into said container and then permit forcing said tube into engagement with said plug whereby said pressurized gas is prevented from escaping from said container.

2. The valve of claim 1 which further comprises:

a cap dimensioned to permit engagement of said cap with said tube.

3. The valve of claim 2 wherein said cap is tethered to an outer surface of said tube in an operable arrangement to permit engaging said cap with an end of said tube opposite an end of said tube engaged with said plug.

4. The valve of claim 1 which further comprises means mounted on said entry end of said tube for engaging a source of compressed gas.

5. The valve of claim 4 wherein said means for engaging a source of compressed gas is a nozzle having one end operably arranged for coupling to said source of compressed gas and another end arranged to telescope onto said entry end of said tube.

6. The valve of claim 5 which further comprises a catch arranged for locking said nozzle onto said entry end.

7. The valve of claim 1 wherein said gas is air.

8. The valve of claim 1 wherein said device comprises flexible vinyl compound.

9. The valve of claim 1 wherein said container is a dunnage bag.

10. A valve for admitting, retaining then releasing pressurized gas in a dunnage bag which comprises:

an inner bowl with a flange around a rim of said inner bowl, a plug in a floor of said bowl and a plurality of apertures through said bowl between said flange and said plug;

an outer bowl with a flange around a rim of said outer bowl and a tube extending through a center hole of said outer bowl;

an edge of said hole integrally sealed to said tube between ends of said tube;

said outer bowl comprising a flexible sheet;

said plug, tube and flanges of said inner and outer bowls operably arranged to permit laminating said flange of said inner bowl to one surface of said dunnage bag and laminating said flange of said outer bowl to an opposite side of said dunnage bag with said flanges surrounding an opening in said container and with said inner bowl and outer bowl extending away from said opening to permit admission of pressurized gas from outside said container, through an entry end of said tube, out of an exit end of said tube, then through said plurality of apertures into said dunnage bag and then permit forcing said tube into engagement with said plug whereby said pressurized gas is prevented from escaping from said dunnage.

a cap dimensioned to permit engagement of said cap with an entry end of said tube;

said cap being tethered to an outer surface of said tube in an operable arrangement to permit engaging said cap with an end of said tube opposite an end of said tube engaged with said plug;

a nozzle having one end operably arranged for coupling to said source of compressed gas and another end arranged to telescope onto said entry end of said tube;

a catch mounted on an outside of said tube adjacent said entry end and arranged for locking said nozzle onto said entry end;

said valve comprising flexible vinyl compound.

* * * * *